US011250215B2

(12) United States Patent
Freed et al.

(10) Patent No.: US 11,250,215 B2
(45) Date of Patent: *Feb. 15, 2022

(54) FORM-BASED TRANSACTIONAL CONVERSATION SYSTEM DESIGN

(71) Applicant: INTERNATIONAL BUSINESS MACHINES CORPORATION, Armonk, NY (US)

(72) Inventors: Andrew R. Freed, Cary, NC (US); Corville O. Allen, Morrisville, NC (US); Joseph Kozhaya, Wake, NC (US); Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/510,852

(22) Filed: Jul. 12, 2019

(65) Prior Publication Data

US 2020/0334333 A1 Oct. 22, 2020

Related U.S. Application Data

(63) Continuation of application No. 16/385,528, filed on Apr. 16, 2019.

(51) Int. Cl.
*G06F 40/30* (2020.01)
*G06F 40/205* (2020.01)

(52) U.S. Cl.
CPC ............ *G06F 40/30* (2020.01); *G06F 40/205* (2020.01)

(58) Field of Classification Search
None
See application file for complete search history.

(56) References Cited

U.S. PATENT DOCUMENTS

| 6,246,981 B1 * | 6/2001 | Papineni ................. G10L 15/22 704/235 |
| 6,505,162 B1 | 1/2003 | Wang et al. |
| 6,886,136 B1 | 4/2005 | Zlotnick et al. |
| 7,149,347 B1 | 12/2006 | Wnek |
| 7,185,276 B2 | 2/2007 | Keswa |
| 7,869,998 B1 | 1/2011 | Di Fabbrizio |

(Continued)

OTHER PUBLICATIONS

IBM: List of IBM Patents or Patent Applications Treated as Related (Appendix P), Mar. 10, 2020, pp. 1-2.

(Continued)

*Primary Examiner* — Neeraj Sharma
(74) *Attorney, Agent, or Firm* — Caleb D. Wilkes (57) ABSTRACT

A method for form-based conversation system design is provided. The embodiment may include ingesting, by a processor, a plurality of forms from a given domain. The embodiment may also include extracting indicators of required input fields from the ingested plurality of forms. The embodiment may further include generating a required input list based on the extracted indicators of the required input fields to update a size of the required input list. The embodiment may also include determining transactional intents based on the required input list. The embodiments may further include generating a dialog flow that satisfies the determined transactional intents.

8 Claims, 6 Drawing Sheets

(56) References Cited

U.S. PATENT DOCUMENTS

| | | | |
|---|---|---|---|
| 8,065,151 B1 | 11/2011 | Bangalore et al. | |
| 8,543,404 B2 | 9/2013 | Moore et al. | |
| 9,613,027 B2* | 4/2017 | Hwang | G06F 40/40 |
| 9,953,651 B2* | 4/2018 | Allen | G10L 15/26 |
| 2004/0264677 A1* | 12/2004 | Horvitz | G10L 15/26 379/265.02 |
| 2007/0256005 A1* | 11/2007 | Schneider | G06F 40/134 |
| 2008/0235567 A1* | 9/2008 | Raj | G06F 40/174 715/226 |
| 2009/0254347 A1* | 10/2009 | Moore | G06F 40/174 704/260 |
| 2009/0254572 A1* | 10/2009 | Redlich | G06Q 10/06 |
| 2010/0293048 A1* | 11/2010 | Singolda | G06Q 30/0244 705/14.43 |
| 2012/0290950 A1* | 11/2012 | Rapaport | H04N 21/8358 715/753 |
| 2013/0077774 A1* | 3/2013 | Lynch, III | H04M 1/663 379/93.02 |
| 2014/0229815 A1* | 8/2014 | Clifford | G06F 40/14 715/224 |
| 2015/0149168 A1 | 5/2015 | Stent et al. | |
| 2015/0302223 A1* | 10/2015 | Casse | G06F 21/6245 726/28 |
| 2017/0019400 A1* | 1/2017 | Drolshagen | H04L 9/3234 |
| 2017/0052940 A1 | 2/2017 | Allen et al. | |
| 2017/0075839 A1* | 3/2017 | Lu | G06F 13/385 |
| 2017/0220540 A1* | 8/2017 | Wang | G06F 40/174 |
| 2019/0182382 A1* | 6/2019 | Mazza | G10L 15/26 |
| 2019/0188409 A1* | 6/2019 | Henein | G06F 16/2282 |
| 2020/0151243 A1* | 5/2020 | Chauhan | G06F 3/0484 |
| 2020/0219053 A1* | 7/2020 | Subramaniam | G06Q 10/0833 |
| 2020/0233752 A1* | 7/2020 | Wong | G06F 16/1748 |
| 2020/0250550 A1* | 8/2020 | Bissell | G06F 40/174 |
| 2020/0334330 A1 | 10/2020 | Freed | |

OTHER PUBLICATIONS

Hitz, "Using Application Ontologies for the Automatic Generation of User Interfaces for Dialog-Based Applications." In: Tjoa, A. et al., (eds) Research and Practical Issues of Enterprise Information Systems. CONFENIS 2016. Lecture Notes in Business Information Processing, vol. 268. Springer, Cham, pp. 16-31, 2016. DOI: 10.1007/978-3-319-49944-4_2.

Bacikova, et al., "Bootstrapping DSLs from User Interfaces", SAC 15, Apr. 13 -17, 2015, Salamanca, Spain, Copyright 2015 ACM, pp. 1-4.

Hakkani-Tur, et al., "Bootstrapping Language Models for Spoken Dialog Systems From the World Wide Web", Icassp 2006, pp. 1-1065-1-1068.

Mell et al., "The NIST Definition of Cloud Computing," Recommendations of the National Institute of Standards and Technology, U.S. Department of Commerce, Special Publication 800-145, Sep. 2011, 7 pages.

Reed, "Bootstrap Dialog: A Conversational English Text Parsing and Generation System", AGI, 2009, Published by Atlantis Press, accessed Apr. 16, 2019, pp. 1-6.

Williams, et al., "Using Wizard-of-Oz simulations to bootstrap Reinforcement-Learning-based dialog management systems", Accessed Apr. 16, 2019, pp. 1-5.

* cited by examiner

■ Department of Motor Vehicles

**APPLICATION TO REPLACE LICENSE PLATE
OR EXPIRATION YEAR DECAL**
Lost, Stolen, Destroyed, Never Received, Defective, Damaged in Mail, or Turned In 452
(Rev. 5/15)

Mail To: ■ Department of Motor Vehicles, P.O. Box ■■■ 28016-8019

Section I   Name and Address of Registered Owner/Plate Information:

302 — Name ________________    Street Address ——304 ________

306 — City ________________   State —308— ____   Zip Code —310— ____

312 — License Plate No. ______   Plate Expiration Month —314— ____   Decal Expiration Year ____   Golf Cart Permit # ____

VIN ________________

316 — Section II   Turn In/Report (check one)   ☐ License Plate   ☐ Decal   ☐ Golf Cart Permit ☐ Suspended   ☐ Exchanged for Special Plate   ☐ Relinquished Special Plate   ☐ Found   ☐ Moved out of state
☐ Voluntary Turn In   ☐ Voluntary Turn In (owner retained plate)   ☐ Other (state reason) ______

☐ Vehicle Sold Date: ____   To: ____   Address: ____

☐ Please check if you wish to obtain a receipt.

Section III   I wish to replace (check one)   ☐ Expiration Year decal   ☐ Plate
(Required) ☐ I attest that I have not requested or received a refund for vehicle property tax or registration fees for this license plate.
If your license plate was turned in on a prior date or other is marked, additional requirements may be necessary for replacement.

I certify the plate or expiration year decal was: *(check one)* ☐ Turned In   ☐ Other (state reason) ______

☐ Lost   ☐ Stolen   ☐ Destroyed   ☐ Never Received   ☐ Defective   ☐ Damaged in Mail

INSURANCE CERTIFICATION
Under penalties of perjury, I declare this vehicle is insured with the following company named below and I will maintain liability insurance throughout the registration period.

Insurance Company Name: ________________

FORM-BASED TRANSACTIONAL CONVERSATION SYSTEM DESIGN

BACKGROUND

The present invention relates, generally, to the field of computing, and more particularly to a dialogue system.

A dialogue system is a computer system utilizing text, speech, and graphics recognition technologies to enable a user to converse with a machine. A typical dialogue system may entail an input recognizer or decoder component, a natural language understanding unit, a dialog manager, an output generator and an output renderer. Dialogue systems can support various applications in business enterprises, education and government. For example, a customer service agent may utilize a dialogue system to retrieve an appropriate answer for a customer's question raised during a call inquiry. Many enterprises utilize a dialogue system to respond to customer technical problems and to diagnose the problem with a product or device. Typically, dialogue systems are widely used by call centers to decrease human workload and are also known as interactive voice response (IVR) systems.

SUMMARY

According to one embodiment, a method for form-based conversation system design is provided. The embodiment may include ingesting, by a processor, a plurality of forms from a given domain. The embodiment may also include extracting indicators of required input fields from the ingested plurality of forms. The embodiment may further include generating a required input list based on the extracted indicators of the required input fields to update a size of the required input list. The embodiment may also include determining transactional intents based on the required input list. The embodiments may further include generating a dialog flow that satisfies the determined transactional intents.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is a diagram showing an exemplary transactional form which may be processed to generate a transactional conversation system according to at least one embodiment;

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a dialog system. The following described exemplary embodiments provide a system, method, and program product to parse paper or digital forms based on sections, key optical characteristics and fields to derive chatbot metadata for transactional actions and produce a dialog flow that matches user intents. Therefore, the present embodiment has the capacity to improve the technical field of a dialog system by deducting characteristics from paper or digital forms and providing intents, entities, values, and context to expedite the creation of dialogs for business or government organizations.

As previously described, a dialogue system is a computer system utilizing text, speech, and graphics recognition technologies to enable a user to converse with a machine. A typical dialogue system may entail an input recognizer or decoder component, a natural language understanding unit, a dialog manager, an output generator and an output renderer. Dialogue systems can support various applications in business enterprises, education and government. For example, a customer service agent may utilize a dialogue system to retrieve an appropriate answer for a customer's question raised during a call inquiry. Many enterprises utilize a dialogue system to respond to customer technical problems and to diagnose the problem with a product or device. Typically, dialogue systems are widely used by call centers to decrease human workload and are also known as interactive voice response (IVR) systems.

Customer service organizations often use large call centers to field a myriad of responses. A significant amount of human resources is spent on often simple transactional queries that may be better served by an automated agent. If those simple queries are handled by automated agents, call center employees may focus their time and energy on more difficult and higher-value generating queries. For example, a bank agent may be asked, "What is my balance?", and an insurance agent may be asked "Has my claim been processed?", or a retailer may be asked, "Has my order shipped?". Each of these queries may initiate a transactional conversation with an intent, a quantity of data to collect from a user, and a response. Today, many organizations utilize chatbots and virtual assistants to handle these queries. However, it may take a significant amount of manual efforts to design and build a dialog system, even one focused on handling these transactional queries. As such, it may be advantageous to, among other things, implement a system capable of building a dialog system that may be capable of handling the above queries by analyzing related forms to extract intents, entities, values and context to be associated with each node of a dialog and grouping the extracted information based on particular information section or types of forms.

According to one embodiment, a form-based transactional conversation system design process may ingest one or more forms or documents to extract indicators of required input fields from the forms. In at least one other embodiment, the form-based transactional conversation system design process may optimize the size of an input list by filtering out metadata that the system may know automatically and removing sensitive terms and inputs that may be present in multiple forms used by an organization to determine important elements for a specific task at hand. In one other embodiment, the form-based transactional conversation system may build dialog systems to satisfy each of the determined transactional intents.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for analyzing business forms to extract intents, entities, values and context and generating a dialog flow that satisfies the extracted information.

Figure 1:
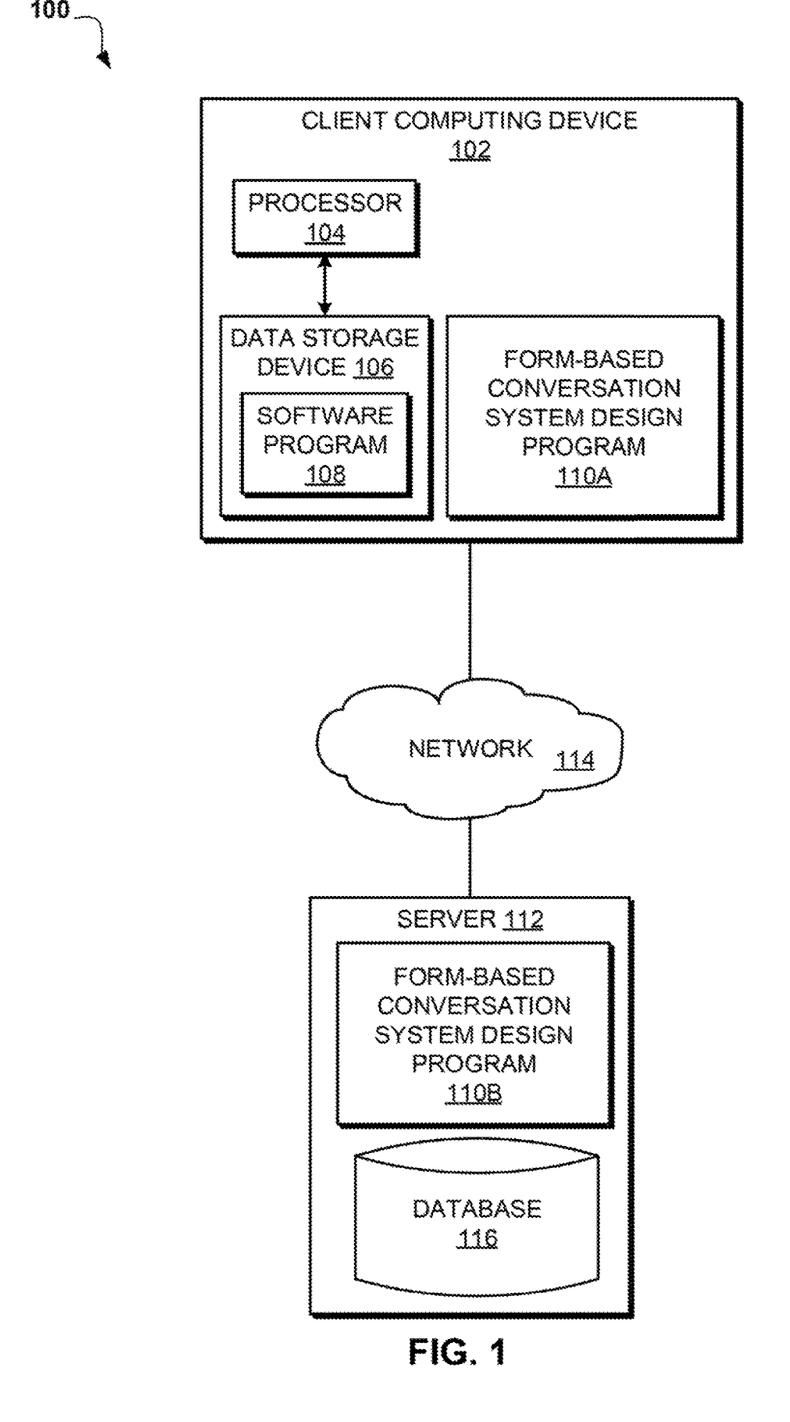
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a form-based conversation system design program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a form-based conversation system design program 110A and 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the form-based conversation system design program 110A, 110B may be a program capable of parsing paper or digital forms and deriving chatbot metadata for transactional actions based on specific sections, key optical characteristics, and fields. The form-based conversation system design program 110A, 110B may also associate the deducted characteristics, such as intents, entities, values, and context with each node of a dialog. The form-based conversation system design process is explained in further detail below with respect to FIG. 2.

Figure 2:
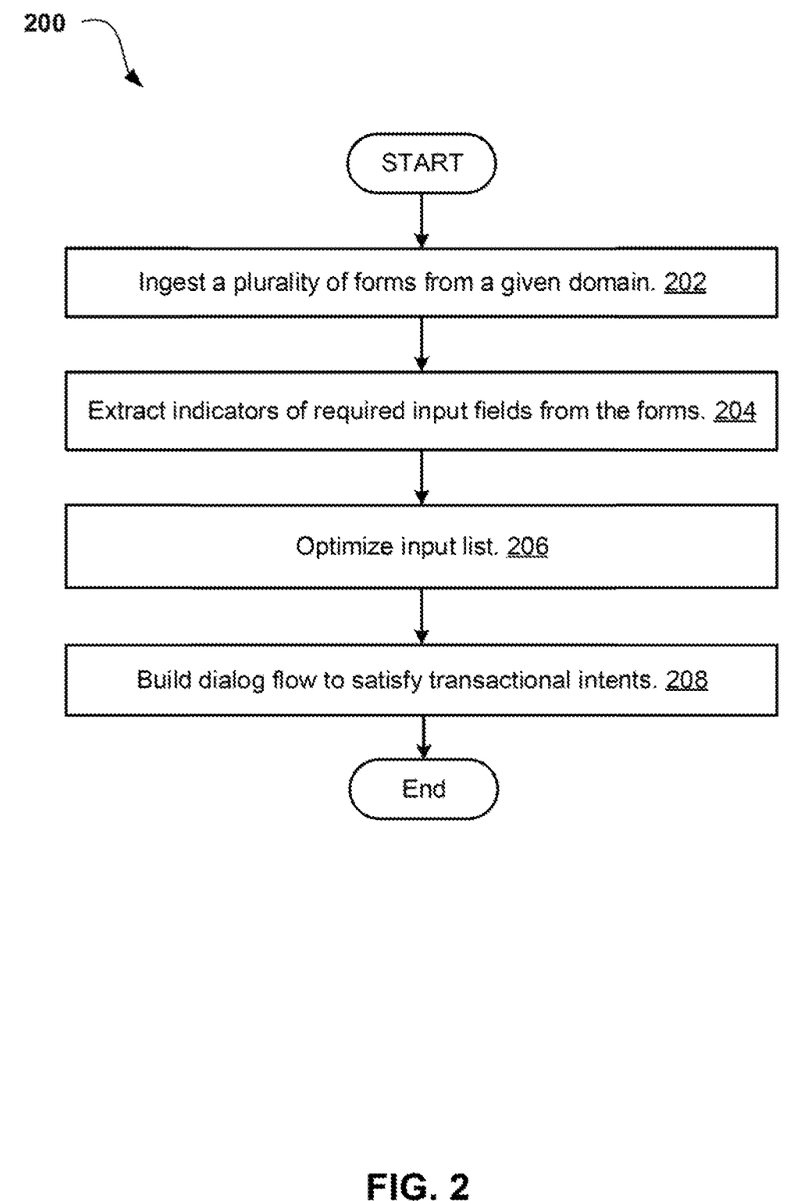
FIG. 2 is an operational flowchart illustrating a form-based transactional conversation system design process according to at least one embodiment.

FIG. 2 is an operational flowchart illustrating a form-based conversation system design process 200 according to at least one embodiment. At 202, the form-based conversation system design program 110A, 110B ingests a plurality of forms from a given domain. According to one embodiment, the form-based conversation system design program 110A, 110B may receive paper forms and convert the paper forms into a digital format utilizing an optical character recognition (OCR) technology. The form-based conversation system design program 110A, 110B may also ingest HTML forms and parse HTML. In at least one other embodiment, the form-based conversation system design program 110A, 110B may store the ingested forms in the database 116 and retrieve the saved forms for later use. Further, the form-based conversation system design program 110A, 110B may also automatically ingest an updated version of particular forms that an organization uses and save the updates in the database 116.

At 204, the form-based conversation system design program 110A, 110B extracts indicators of required input fields from the ingested forms. According to one embodiment, the form-based conversation system design program 110A, 110B may analyze the ingested forms and determine required input fields from the forms. For example, the form-based conversation system design program 110A, 110B may look for fields containing the keywords, such as "Required", "Mandatory" or "Must provide", etc. According to one other embodiment, the form-based conversation system design program 110A, 110B may extract visual indicators, such as bold or underlined words, words in red or an entry field with * asterisk, etc. The form-based conversation system design program 110A, 110B may also extract a keyword list, such as ID, Name, and DOB, etc. In at least one other embodiment, the form-based conversation system design program 110A, 110B may scan for validation logic for HTML forms.

At 206, the form-based conversation system design program 110A, 110B optimizes the input list. It may be advantageous to discern only the important fields from the ingested forms as many forms today contain "all fields are required" language in order to gather a superset of information that may never be needed. According to one embodiment, the form-based conversation system design program 110A, 110B may filter out metadata that the program may automatically determine. For example, the form-based conversation system design program 110A, 110B may filter out fields requiring data related to today's date, login ID, phone number, etc. The form-based conversation system design program 110A, 110B may also utilize domain kits to classify what elements are important. For example, the form-based conversation system design program 110A, 110B may determine that information related to the account number or account type is important for banking and information related to order number, credit card number, etc. for retail. The form-based conversation system design program 110A, 110B may remove sensitive terms, such as gender, or race, etc. In at least one other embodiment, the form-based conversation system design program 110A, 110B may utilize a knowledge database for additional consolidation of certain information. For example, the form-based conversation system design program 110A, 110B may utilize a knowledge database to validate an individual's identity only with name and date of birth information, not other information such as telephone number or address information. The form-based conversation system design program 110A, 110B may further mask personally identifiable information (PII), such as social security number (SSN) or credit card number by only asking for the last 4 digits. According to one other embodiment, the form-based conversation system design program 110A, 110B may remove inputs that are present in multiple forms from one company, and by removing the common elements, the form-based conversation system design program 110A, 110B may discern critical elements required for specific tasks.

At 208, the form-based conversation system design program 110A, 110B builds dialog flow to satisfy transactional intents. According to one embodiment, the form-based conversation system design program 110A, 110B may analyze each extracted key field or section and generate and collect intents to save in a database for later uses. For example, the form-based conversation system design program 110A, 110B may parse a form issued by a motor vehicle agency and users of a chatbot may want to update, retrieve, or provide data elements extracted from the parsed motor vehicle form. More specifically, the users may want to provide a license plate number or retrieve a license expiration date by phone. In this example, the form-based conversation system design program 110A, 110B may generate dialog flow containing sentences, such as "I want to update my license plate number" or "I want to retrieve my license expiration date". In one other embodiment, the form-based conversation system design program 110A, 110B may generate branches for each extracted intent and add a "transfer out" intent to rout to human operators. For example, the form-based conversation system design program 110A, 110B may determine other intents related to "I want to update my license plate number", such as "I want to update my license plate numbers for my other cars" or "I want to update my license plate number and find out what other information I need to update". In the latter case, the form-based conversation system design program 110A, 110B may provide an additional option of transfer-out to speak with a human operator and ask related questions. The form-based conversation system design program 110A, 110B may also create dialog nodes with each branch to collect each of the required inputs and generate a placeholder orchestration to satisfy the intent once the required inputs are collected. Also, the form-based conversation system design program 110A, 110B may extract inputs from a form that could be keyed off of checkboxes or questions. For example, if a user may want to find out how to send information or how to receive information and options are either via fax or email, the form-based conversation system design program 110A, 110B may generate a placeholder to notify the user of the options and provide a necessary fax number or email addresses. If a user answers that the user wants to send information via fax, the form-based conversation system design program 110A, 110B may recognize that a required output response is found and generate the necessary dialog node to prompt for the fax number and then may call a Fax API. According to at least one other embodiment, the form-based conversation system design program 110A, 110B may interact with a pre-canned intents dialog flow based on form for a specific client. For example, if a bank already utilizes a pre-configured chatbot to communicate with customers but wants to make dialog flow more tailored to specific clients, such as platinum cardholders, the form-based conversation system design program 110A, 110B may modify the pre-canned dialog flow by integrating inputs or information as to what platinum cardholders may often ask or want to find out with the already existing dialog flow.

Below is a table to represent an exemplary break-down of bank form elements and potential dialog entities and values to drive dialog flow.

TABLE I

<A break-down of elements and potential dialog entities and values based on a bank form>

| Form | | Dialog | | |
|---|---|---|---|---|
| Bank Account Fields | Options | Keys | Values | Entities |
| Name | | Common/ Backend | Common/ Backend | |
| Address | | Common/ Backend | Common/ Backend | |
| Category | Checking/ Savings | | | |
| Limit | | Min Balance | $1000/$2000/ $5000 | |
| Fees Level | Gold/ Platinum | | Customer Care | |

The form-based conversation system design program 110A, 110B may parse a bank form and find fields, such as bank account, name, address, type, limit, fees, and type. Each field may have options for a user to select. For example, for the "Category" field, options may be either checking or savings, and for the "Level" field, options may be either gold or platinum. For example, if a customer would like to open a savings account, the form-based conversation system design program 110A, 110B may generate a dialog flow embedded with information such as how much deposit is required for opening a savings account, a transfer-out option to speak to a human operator or to a chatbot that directs, or reconnecting to the Internet or to any related API. The form-based conversation system design program 110A, 110B may also extract input variables from the bank form, which may include fixed/closed variables and fixed/open variables. Fixed/closed variables may relate to variables involving only a small n set of available options (e.g. checkboxes) and these variables may be immediately converted into entities and integrated with pre-canned intents. Fixed/open variables may include short-form input (i.e. fixed length) or variables involving only small n set of options (e.g. $1000, $2000, $5000). The form-based conversation system design program 110A, 110B may further detect multiple words or sentences and clustering of the detected texts to extract each cluster as an individual intent later. For example, a "A Loan Purpose" field may be used to derive intents for "new_business_loan_purpose", "buy_house_loan_purpose" or "buy_car_loan_purpose".

Referring now to FIG. 3, a diagram showing an exemplary transactional form which may be processed to generate a transactional conversation system is depicted according to at least one embodiment. According to one embodiment, the form-based conversation system design program 110A, 110B may parse a form "Application to Replace License Plate or Expiration Year Decal" and identify required fields in bold or ones with checkboxes. For example, the form-based conversation system design program 110A, 110B may identify required fields, such as Name 302, Street Address 304, City 306, State 308, Zip Code 310, License Plate No.

312, Plate Expiration Month 314. The form-based conversation system design program 110A, 110B may also determine whether a required field requires one or more selections. For example, Section II Turn-In/Report 316 may allow "check one", and the form-based conversation system design program 110A, 110B may generate a dialog flow for each report, such as "license plate", "Decal", or "Golf Cart Permit". The form-based conversation system design program 110A, 110B, in this example, may determine key fields and generate intents and potential values related to license plate number, plate expiration month or Turn in ("_________"), License Plate, Decal or Golf Cart. The form-based conversation system design program 110A, 110B may then proceed to optimize the size of the input list by removing or masking any sensitive information or consolidating the basic information to identify a user, etc. Exemplary dialog flow generated by the form-based conversation system design program 110A, 110B may be a statement asking a user to select an option, such as "I want to provide my license plate number" or "I want to retrieve my license expiration date", etc.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the form-based conversation system design program 110A, 110B may parse online forms and generate a dialog flow in survey forms so that a user may interact with the generated dialog system using only texts.

Figure 4:
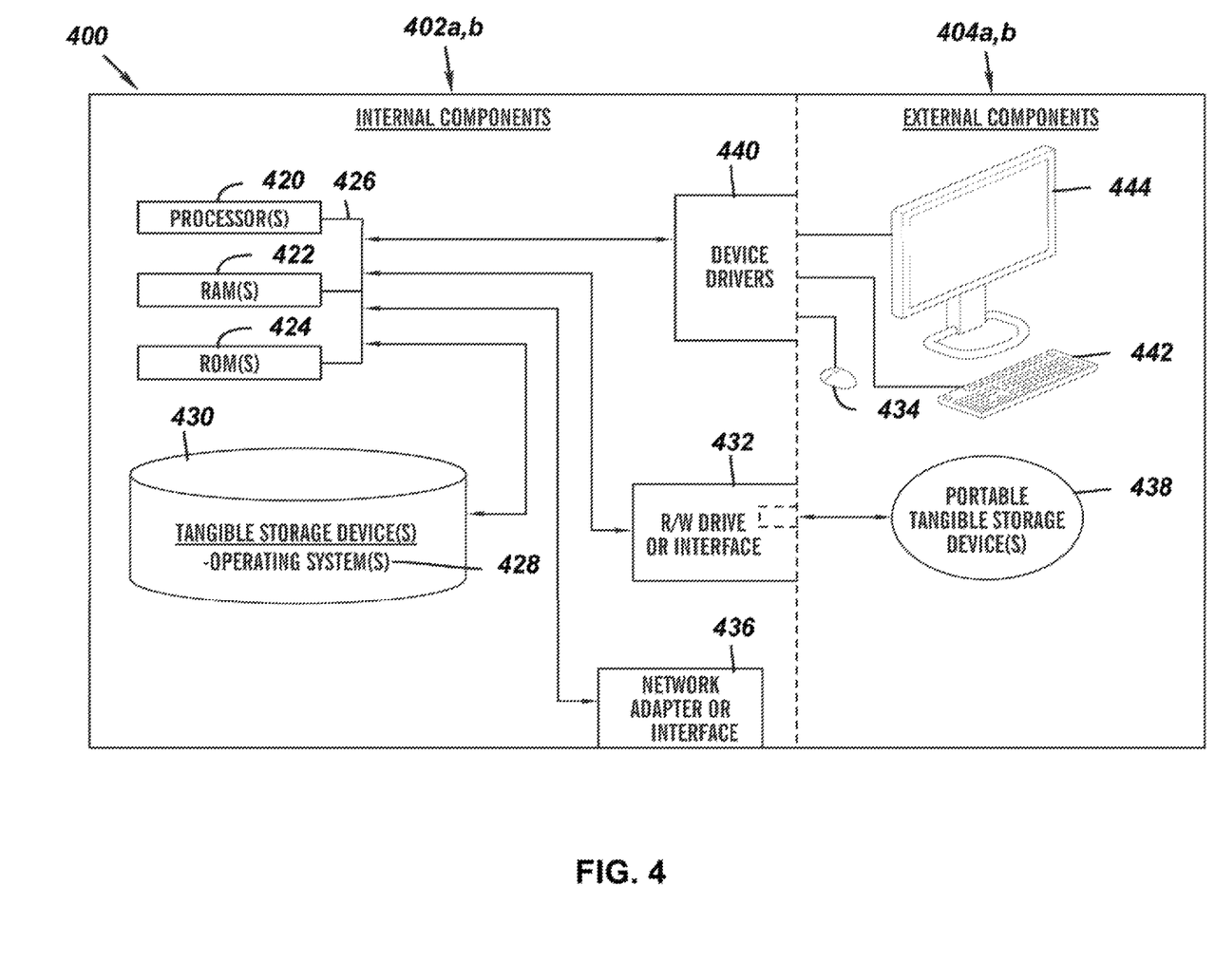
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 408 and the form-based conversation system design program 110A in the client computing device 102 and the form-based conversation system design program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the form-based conversation system design program 110A, 110B can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the form-based conversation system design program 110A in the client computing device 102 and the form-based conversation system design program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the form-based conversation system design program 110A in the client computing device 102 and the form-based conversation system design program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
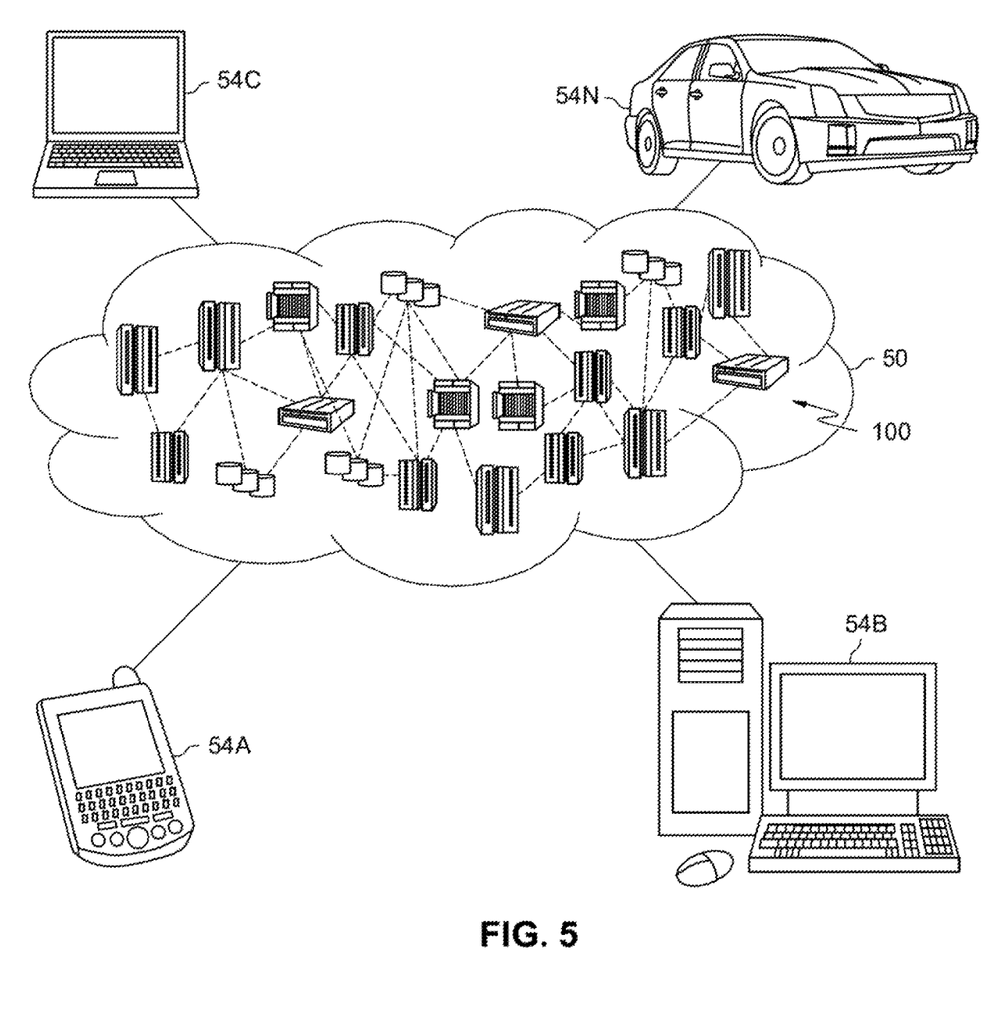
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
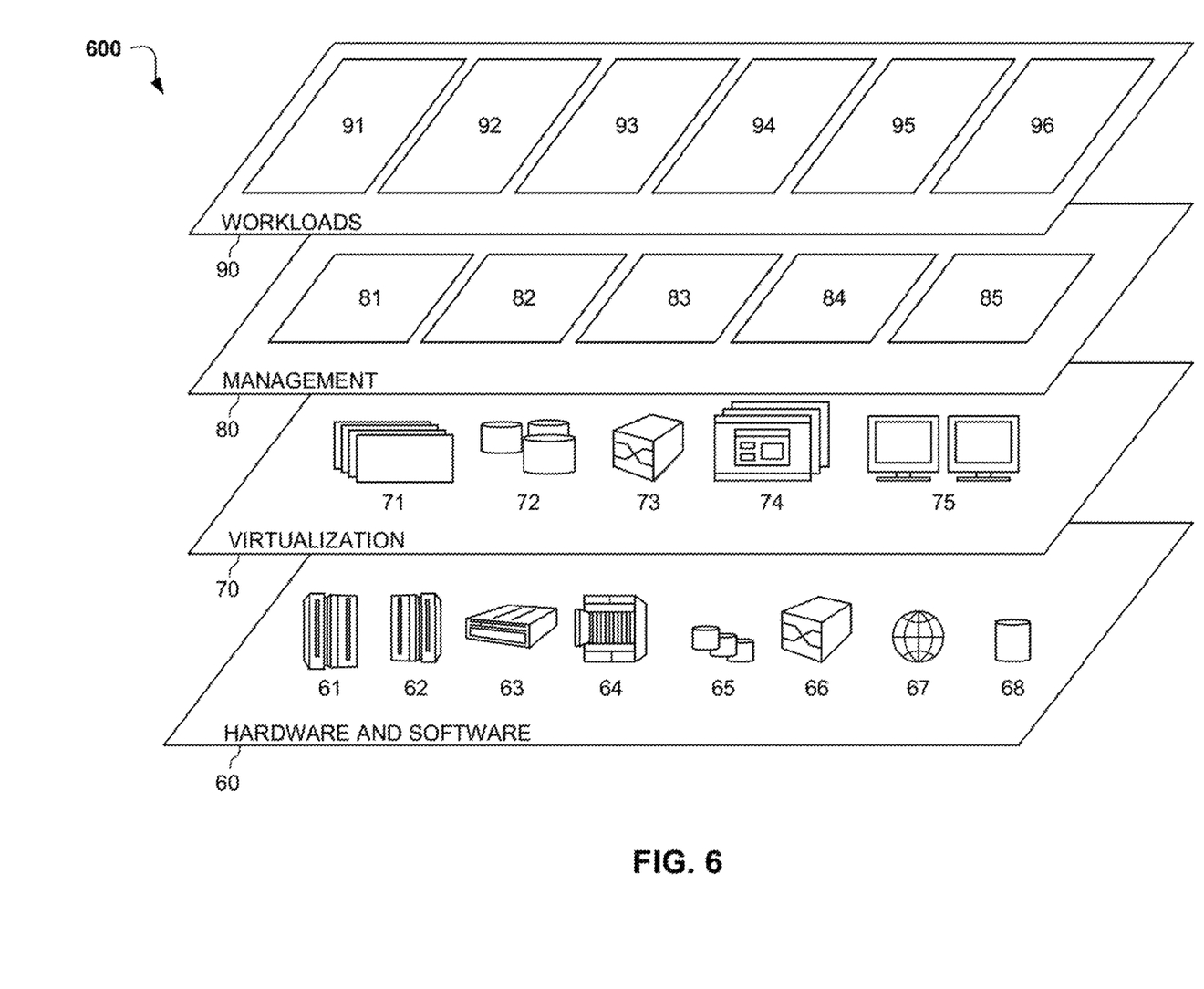
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and form-based conversation system design 96 may relate to parsing forms or documents and generating a dialog flow based on extracted key information from the parsed materials.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for form-based conversation system design, the method comprising:
   ingesting, by a processor, a plurality of forms from a given domain;
   extracting indicators of required input fields from the ingested plurality of forms;
   generating a required input list based on the extracted indicators of the required input fields, wherein the generating comprises automatically filtering out automatically determinable fields from the ingested forms, wherein the generating further comprises automatically removing sensitive terms from the required input fields;
   determining transactional intents based on the required input list; and
   generating a dialog flow that satisfies the determined transactional intents and that validates an identity of an individual, wherein the dialog flow also comprises branches for each of the determined transactional intents, and comprises an intent to transfer out from the branches to a human operator.

2. The method of claim 1, further comprising:
   parsing forms that contain commonality of important input fields; and
   analyzing the plurality of forms in comparison to the parsed forms.

3. The method of claim 1, further comprising:
   in response to generating the required input list, filtering out general data that is obtainable regardless of the ingested forms.

4. The method of claim 1, further comprising:
   utilizing domain kits associated with each industry to determine critical elements of each form.

5. The method of claim 1, further comprising:
   removing inputs that are present in multiple forms from an organization.

6. The method of claim 1, further comprising:
   integrating the generated dialog flow with an already existing dialog flow system.

7. The method of claim 1, wherein the automatically determinable fields comprise at least one member selected from a group consisting of a date, a login ID, and a phone number.

8. The method of claim 1, wherein the dialog flow validates the identity of the individual by using only a name and a date of birth information.

* * * * *